US008509031B2

(12) United States Patent
Smith

(10) Patent No.: US 8,509,031 B2
(45) Date of Patent: Aug. 13, 2013

(54) H-BRIDGE PULSE GENERATOR

(76) Inventor: Stephen Smith, Appomattox, VA (US)

(*) Notice: Subject to any disclaimer, the term of this patent is extended or adjusted under 35 U.S.C. 154(b) by 499 days.

(21) Appl. No.: 12/800,945

(22) Filed: May 26, 2010

(65) Prior Publication Data

US 2010/0254221 A1 Oct. 7, 2010

Related U.S. Application Data

(63) Continuation-in-part of application No. 11/786,538, filed on Apr. 12, 2007, now abandoned.

(51) Int. Cl.
*H04B 1/02* (2006.01)

(52) U.S. Cl.
USPC .......... 367/137

(58) Field of Classification Search
USPC .......... 367/140, 137, 904; 323/282; 73/643
See application file for complete search history.

(56) References Cited

U.S. PATENT DOCUMENTS

| | | | | |
|---|---|---|---|---|
| 3,961,284 | A * | 6/1976 | Flora | 331/116 R |
| 5,426,388 | A * | 6/1995 | Flora et al. | 327/110 |
| 6,192,760 | B1 * | 2/2001 | MacLauchlan et al. | 73/643 |
| 6,214,297 | B1 * | 4/2001 | Zhang et al. | 422/186 |
| 7,437,934 | B2 * | 10/2008 | Shoureshi | 73/643 |
| 2008/0087091 | A1 * | 4/2008 | Shoureshi | 73/602 |
| 2009/0102443 | A1 * | 4/2009 | Smith | 323/282 |

* cited by examiner

*Primary Examiner* — Daniel Pihulic
(74) *Attorney, Agent, or Firm* — James W. Hiney

(57) ABSTRACT

Circuitry for high-power, high-frequency excitation of electromagnetic acoustic transducers (EMAT) without the use of a matching transformer is described. This circuit contains at least 4 switching devices, arranged in an H-Bridge configuration to drive EMATs over a range of frequencies. The switching devices can be connected in parallel with respect to the H-Bridge and switched in sequence for greater power output and variety of wave forms including, Churp, Hemming window tone burst, rectangular tone burst and Barker Code wave forms. A circuit for driving sensor coils of an EMAT to correct the disadvantages of conventional pulsers. A plurality of switching devices are connected in parallel and augmented with support circuitry to provide increased power output, stability, reduced noise and complex output wave forms. This design provides for the application of modulated pulses such as multi-pulse, multi-frequency bursts with peak power outputs over 20,000 watts and frequencies over 10,000 Hertz.

10 Claims, 17 Drawing Sheets

CHRIP

PARALLEL OF H BRIDGE

H-BRIDGE PULSE GENERATOR

This application is a Continuation-In-Part of application Ser. No. 11/786,538 fo;ed Apr. 12, 2007, entitled H-BRIDGE PULSE GENERATOR, now abandoned

BACKGROUND OF THE FIELD

EMAT driver circuit has typically used a push-pull topology as illustrated in FIG. 1. This circuit provides a tone burst of current consisting of a specified number of cycles in the EMAT transmitter coil.

In the past EMATS (electromagnetic acoustic transducers) have typically used a push-pull topology. This type of circuit provides a tone burst of current consisting of a specified number of cycles in the EMAT transmitter coil. The system would be switched on for a period of time and then switched off for a period of time, followed by the switching on for the same period of time another coil to avoid saturation of the transformer and then switching it off at the end of the cycle. This cycle produces a square wave output that can be transformed into the voltage required to drive the EMAT and its tuning components.

The operation of the push pull is: switch Q1 on for a period of time and then switch off Q11 for a period of time, followed by the switching of Q2 on for the same period of time to avoid saturation of transformer and then switch off at the end of the cycle. This produces a square wave output that can be transformed to the voltage required to drive the EMAT and its tuning components. However, the transformer substantially limits the range of frequencies for which sufficient drive current can be produced. The parasitic components such as stray capacitance and leakage inductance associated with the transformer can also consume power and limit the current that would otherwise be delivered to the EMAT. Furthermore, the transformer can saturate if it is pulsed in patterns other than a symmetric tone burst, thereby limiting the power delivered to the EMAT. Also, the push pull topology cannot be used to quench the ringing of the EMAT or reflections of power from the transmission line between the pulser and the EMAT. Finally the output transformer adds to the size, weight and cost of the pulser, particularly when low frequency excitations are required and the transformer cores are relatively large.

BACKGROUND OF ART

FIG. 1 illustrates a push pull topology that is typically used transmit electrical power to an EMAT. This circuit injects a tone burst of current at a specified frequency and consisting of a specified number of cycles in an EMAT transmitter coil. During slightly less than a half cycle and then switched off until the next cycle begins. Switch Q2 is turned on for the same period of time shortly after Q1. The delay between switching off Q1 and switching on Q2 avoids saturation of the transformer. Similiarly, Q2 is switched off just before the end of the cycle the end of the cycle. This operation produces a square wave output which is transformed to the voltage required to drive the EMAT coil. The use of the transformer, however, limits the range of frequencies for which sufficient drive current can be produced. Parasitic components such as stray capacitance and leakage inductance associated with the transformer can also consume power and limit the current that would otherwise be delivered to the EMAT. If a pulse pattern other than a symmetric tone burst is applied to the transformer, the power delivered to the EMAT can be limited.

U.S. Pat. No. 5,426,388, to Flora discloses a tone burst EMAT pulser, which is composed primarily of a half bridge. This circuit was designed with a minimum of components so that it could be imbedded in the EMAT., thereby eliminating the transmission of high power at high frequencies over long distances. With no high frequency power transmission there would be no unwanted ringing or noise associated with a transmission line. The drawback of this design is that it provides only one fourth the power that a full bridge Design.

The "push pull" action of the half bridge upper switching device sources the DC voltage across the load on the first half of the cycle, and the lower device sinks the voltage on the second half of the cycle. The full bridge sources the DC voltage across the load with an upper and lower switch on the first half of the cycle, and on the next half cycle sources the DC voltage across the load with an upper and lower switch in reverse. The switching actions of a full bridge produces twice the AC voltage of a half bridge.

The performance of this circuit is further limited in that the IGBT specified, currently have a limited frequency response compared to recent commercially available power Mosfets and the circuit has no freewheeling diode to protect the IGBT. The use of the H-Bridge topology for the core of EMAT pulser circuitry, as described in this patent alleviates these drawbacks.

The turn off time (storage time and fall time) of the insulated gate bipolar transistor (IGBT) was limited on older models. The upper frequency limit for most IGBTs is approximately 200 Khz. Recent commercially available power metal-oxide-semiconductor field-effect transistors MOSFETs are not as limited by storage and turn-off time and can work up to frequencies of 30 MHz.

The circuit has another drawback without a freewheeling diode to protect the switching device (IGBT). The diode redirects the current around the device during shutoff when a inductive load is opened by the switching device (IGBT) specified currently have a limited frequency response compared to recent commercially available power MOSFETs and the circuit has no freewheeling diode to protect the IGBT. The use of an H-Bridge for the core of the EMAT pulse circuitry, per this invention, eliminates the drawbacks described above.

Historically, H-Bridge configurations have been used extensively in most DC power supplies, power conversion equipment and motor control equipment below 500 khz. In these applications it is used to convert DC power to AC power or pulsating DC power for power supplies, power conversions use and motor control. Many different drive circuits have been deployed to control switches within the H-Bridge to provide various output currents and voltages.

SUMMARY OF THE INVENTION

The invention is an electronic circuit that produces greater power output power, increased efficiency, a wider frequency response and reduces ring-down noise in a physically smaller package compared to conventional RF pulsers for EMATs. Specifically, the H-bridge circuit topology provides several advantages for the EMAT pulser. This circuit can produce transmitters pulses that are normally impeded by the transformer that is required with the push pull design. Additionally the output impedance of the design will be low with the upper two switches closed or the lower two switches closed.

This invention consists of arrangements of electronic circuits that are based on H-Bridge topology for the purpose of producing greater output power, increased efficiency, a wider frequency response and reducing ring-down noise in a physically smaller package compared to RF pulse sources typically used with EMATs. The basic H-bridge circuit has been modified and augmented primarily by connecting the switching devices, e.g., power MOSFETs, in parallel is some or all of the branches of the H-bridge configuration. Driver circuits have been designed and pulsing sequences have been devised to improve stability, distribute the current supplied to the load evenly among the switching devices and to generate output waveforms that improve the performance of the EMAT.

When a transformer is required, the switching of the transformer must not exceed the volt-second balance or saturation of the transformer will occur. Transformers can be designed with significantly turns to alleviate the saturation at a given frequency and which adds additional parasitic elements, i.e., stray capacitance and inductance, that inhibit high frequency operation. This occurs when the leakage inductor in the transformer increases which is defined by E=Ldi/dt. The current has to slew over a given period of time and the voltage will be larger to slew in less time. The turns ratio to achieve 1200 v p-p need for the present EMAT is a step up ratio in the transformer that adds an additional leakage inductor to the output. The present invention removes transformer and is now only limited by the switching characteristics of the output devices without the transformer parasitics.

An additional benefit of the current invention is the propagation delay to output is reduced by removal of transformer. The currents flowing through the transformer with the parasitic components creates an undesirable phase delay that is reduced without transformer. The parasitic components also create an undesirable ringing when the switches turn off the transformer, which appears to the output that is removed with present design. The High Frequency Mosfets used in the H Bridge are rated for the load current and voltage rating of at least 88VDC to prevent failures. This is a benefit of using an H-bridge instead of the original design, for the voltage across the devices would have to be twice the voltage for a given buss voltage, which limits the choices of electronic component that can be used.

A circuit has been designed in which a diode is connected in series with each of the switching devices in the branches of the H-bridge to protect the device from damaging reverse currents. An optically coupled driver circuit has been designed to improve stability. A circuit has been designed whereby a plurality of switching devices is connected in parallel in the lower branches of the H-bridge configuration so that when the switching devices are turned on and off in the proper timed squences the unwanted transient electrical output currents flowing through an inductive load such as an EMAT coil are quenched. A circuit has been designed in which a plurality of switching devices such as power Mosfets connected in parallel in all branches of the H-bridge configuration whereby the switching device are turned on and off in timed sequences that results in increased efficiency and greater electrical power delivered to the inductive load. A circuit has been designed in which a plurality of switching devices are connected in parallel in all branches of the H-bridge configuration whereby the switching devices in the same branch to be turned on and off in timed sequences that allow the other switching devices in the same branch to be turned off when any one of the switching devices in that branch is turned on thereby increasing the efficiency of the pulser in delivering increased electrical power to the inductive load. A logic circuit has been designed that is comprised of four units, each containing an RS Flip-Flop, a delay and 2 AND gates that provide the drive inputs to each of the Mosfets in proper sequence for the generation of current outputs from each of the switching devices in a branch of the H-bridge and delivers current to the inductive load while the other switching devices in a branch are turned off. A circuit has been designed where a plurality of H-bridges each containing switching devices such as Mosfets with outputs coupled in parallel through transformer windings in all branches the H-bridge configuration whereby the switching devices are turned on and off in timed sequences resulting in amplitude modulated output voltage and current that is concentrated in select narrow power spectra.

DESCRIPTION OF THE PREFERRED EMBODIMENTS

Figure 1:
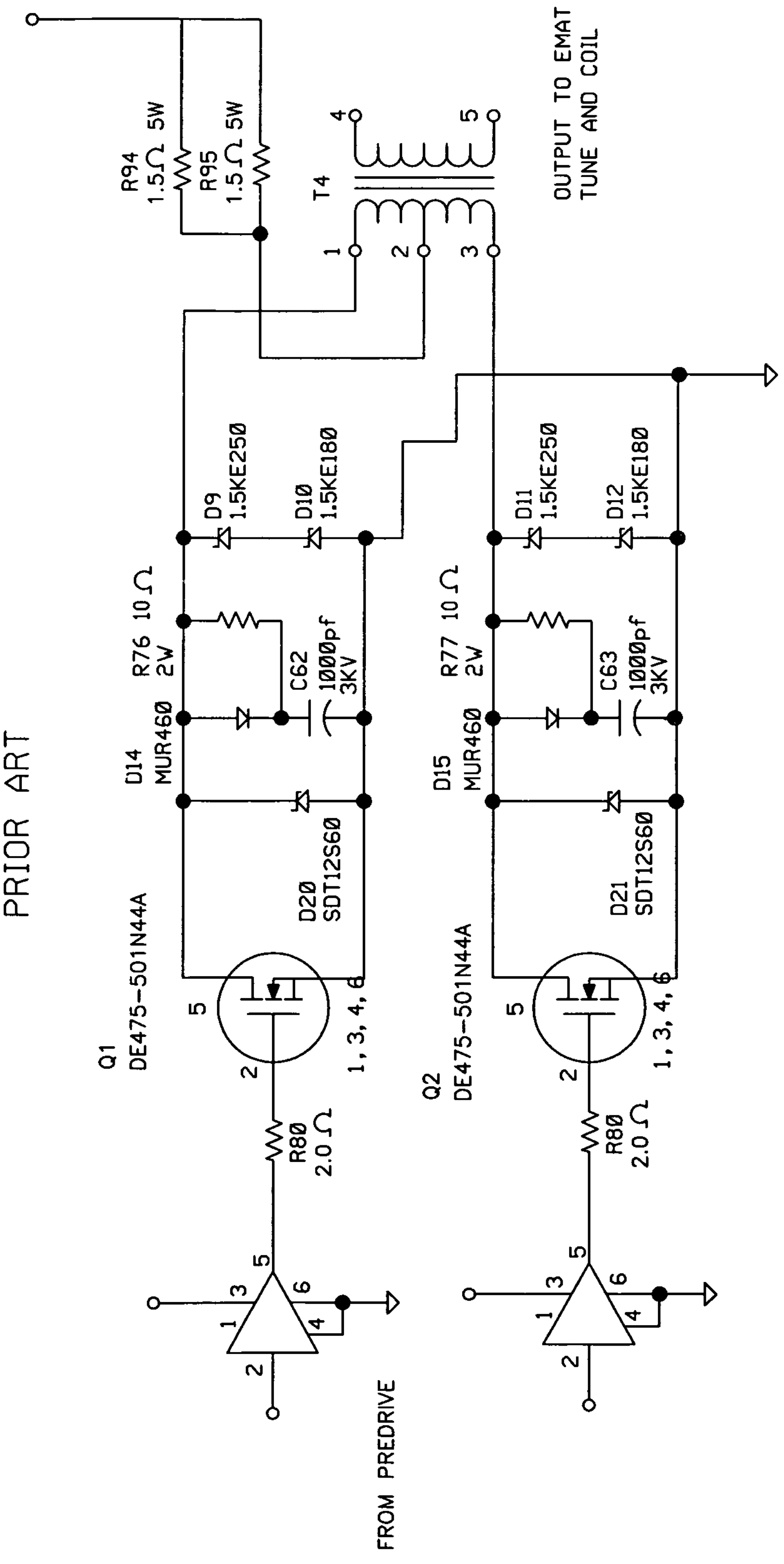
FIG.1 PRIOR ART
FIG. 1 is a schematic representation of a push pull high frequency tone burst.
Figure 2:
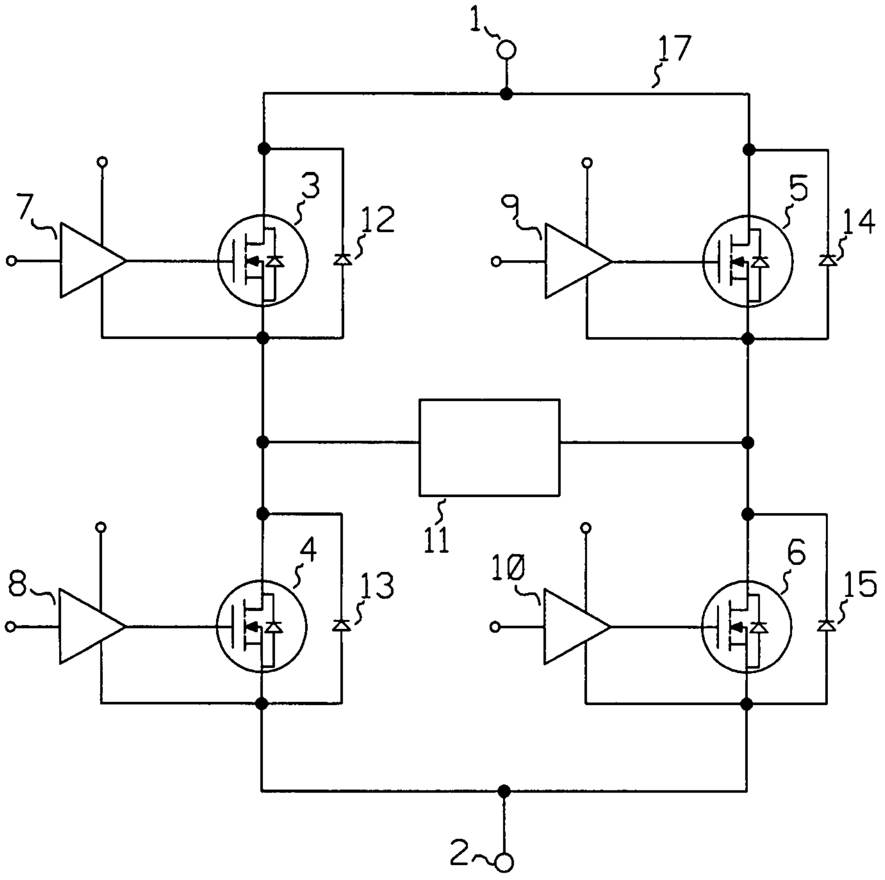
FIG. 2 is a schematic representation of an H Bridge for high frequency tone burst.

FIG. 2 is a schematic diagram of the primary embodiment of this invention. The H-bridge circuit 17 eliminates the transformer and provides a means for high-speed switching circuit, bipolar-high voltage, variable frequency excitation and elimination of unwanted oscillations frequency, reversible output, quenching of output, with various modes of operation for use of transmission of various outputs for EMAT transducers.

The load, 11, may or may not include a transformer. If the transformer is eliminated the H-bridge circuit, 17, provides a means for high speed switching of a bipolar, high voltage, at a variable frequency excitation. This facilitates the elimination of wanted oscillations frequency, the provision for reversible output polarity, and quenching of transient output noise by the incorporation of various circuit modifications and modes of operation. Additional circuit and operational modifications are applied to increase output power, frequency bandwidth and various output wave forms for use with EMAT transmitter coils.

The operation is as follows: A voltage source of 650 vdc is applied positive from point 1 to point 2. The gate drivers 7 and 10, which is an optical type, needed for high frequency drive, is applied to Mosfet 3 and Mosfet 6. This results in current flowing from point 1 through Mosfet 3 to EMAT transducer 11, through Mosfet 6 to point 2. This results in a positive output across EMAT transducer. The on time of driver 7 and 10 is on determined by the requirements of the users frequency and pulse period. The pair of drivers 7 and 10 is then turned off. Drivers 8 and 9 are turned on after a decay of approximately 5% of the on time. This prevents shoot through, which is a condition of two switches conducting at the same time in series with each other and the DC buss points 1 and 2 with no load between them. An example if Mosfet 3 and 4 or Mosfet 5 and 6. Drivers 8 and 9 turn on Mosfet 4 and 5, the current then reverses through the EMAT transducer 11 for a determined by the requirements of the users frequency and pulse period. The resulting waveform is a tone burst shown in FIG. 4. Freewheeling diodes 12, 13, 14 and 15 provide an alternate path for the currents during turn off of the drivers 7, 8, 9 and 10, to protect Mosfets 3, 4, 5, 6. This is necessary for the intrinsic diode inside the Mosfet will conduct which may not allow Mosfets to turn off resulting in shoot through. The EMAT transducer is operated below, at, and above resonance, which results in a sinusoidal current that may cause damage to the Mosfets without diodes 12, 13, 14 and 15.

Operation of the H-bridge for generation of a tone burst starts with the application of a positive voltage source of approximately 650 volts DC between terminals 1 and 2. The gate drivers 7 and 10, then switch on Mosfet 3 and Mosfet 6. This starts a current flowing from point 1 through Mosfet 3 to the EMAT transducer 1 and then through Mosfet 6 to the ground terminal 2. This results in the application of the DC voltage across the EMAT coil. The on-time of gate drivers 7 and 10 are the turned off near the end of the half cycle. After a delay of approximately 5% of the half cycle, optical gate drivers 8 and 0 turn on Mosfet 1 and Mosfet 5 for approximately 95% of a half. Mosfets 1 and Mosfet 5 are then turned off for approximately 5% of a half cycle drivers 7 and 10 are turned on to begin the next full cycle.

Figure 3:
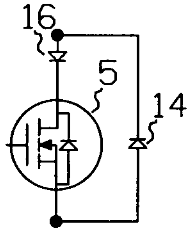
FIG. 3 is a schematic representation of an alternate freewheeling diode arrangement (diode in series with a power Mosfet switching device)

An alternate freewheeling diode protection scheme is shown in FIG. 3. This is used if the diode forward drop exceeds the forward drop of the intrinsic diode inside the Mosfets. The extra diode 16 assures that the Mosfet will only conduct in the forward direction. When all of the Mosfets are turned off, the impendence see from the EMAT transducer 11 is almost infinite resulting in the end of transmission.

The H-Bridge shown in FIG. 2 can quench the EMAT transducer 11 if needed to prevent any ring back. The function is the same as mentioned above with these exceptions: In FIG. 3, when Mosfets 4 and 5 are about to turn off, Mosfet 5 turns off, Mosfet 4 stays on, and after a delay of approximately 5% of the on time Mosfet 6 is turned on. The Mosfets are kept on for a period determined by the time needed to produce a low impedance path foe the EMAT transducer 11 to end any additional transmission.

Several other drive schemes are shown in FIG. 4, FIG. 5, FIG. 6, FIG. 7, FIG. 8 and FIG. 9. These drive schemes represent various outputs useful in EMAT transducer applications. It is also possible to parallel the H-Bridges with two methods for higher output power and longer duty cycles and these are: Directly paralleling another circuit as shown in FIG. 2, and realizing Mosfets will share a portion of the current, although at these frequencies it will not be equal. The other method is to sequentially switch the two or more H bridges in a different fashion shown in FIG. 9. Mosfet 1 and Mosfet 2 are switched on for a period on time determined by the requirements of the users frequency and pulse period. Mosfet 1 and Mosfet 2 are switched off, Mosfet 3 and 4 are switched on of time determined by the requirements of the users frequency and pulse period. Mosfet 3 and Mosfet 4 are switched off. Mosfet 5 and Mosfet 6 are switched on for a period of time determined by the requirements of the users frequency and pulse period. Mosfet 3 and Mosfet 4 are switched off Mosfet 5 and Mosfet 6 are switched on for a period of time determined by the requirements of the users frequency and pulse period. Mosfet 5 and Mosfet 6 are switched off. Mosfet 7 and 8 are switched on of time determined by the requirements of the users frequency and pulse period. Mosfdt 7 and 8 are switched off. When the Mosfet are all cycled through the sequence begins at Mosfet 1. The output will be the same for any of the figures relating to the H Bridge. The advantage to switching in this manner is that the device currents are equal but the time that a Mosfet is on is half of the ones in a single configuration., which allows the dissipation of each of the devices to be twice that of the single H Bridge. This configuration can be expanded "n" number of times.

While specific embodiments of the invention have been shown and described in detail to illustrate the specific application of the principals of the invention, it will be understood that the invention nay be embodied as fully described in the claims, or as otherwise understood by those skilled in the art, without departing from such principals.

Figure 11:
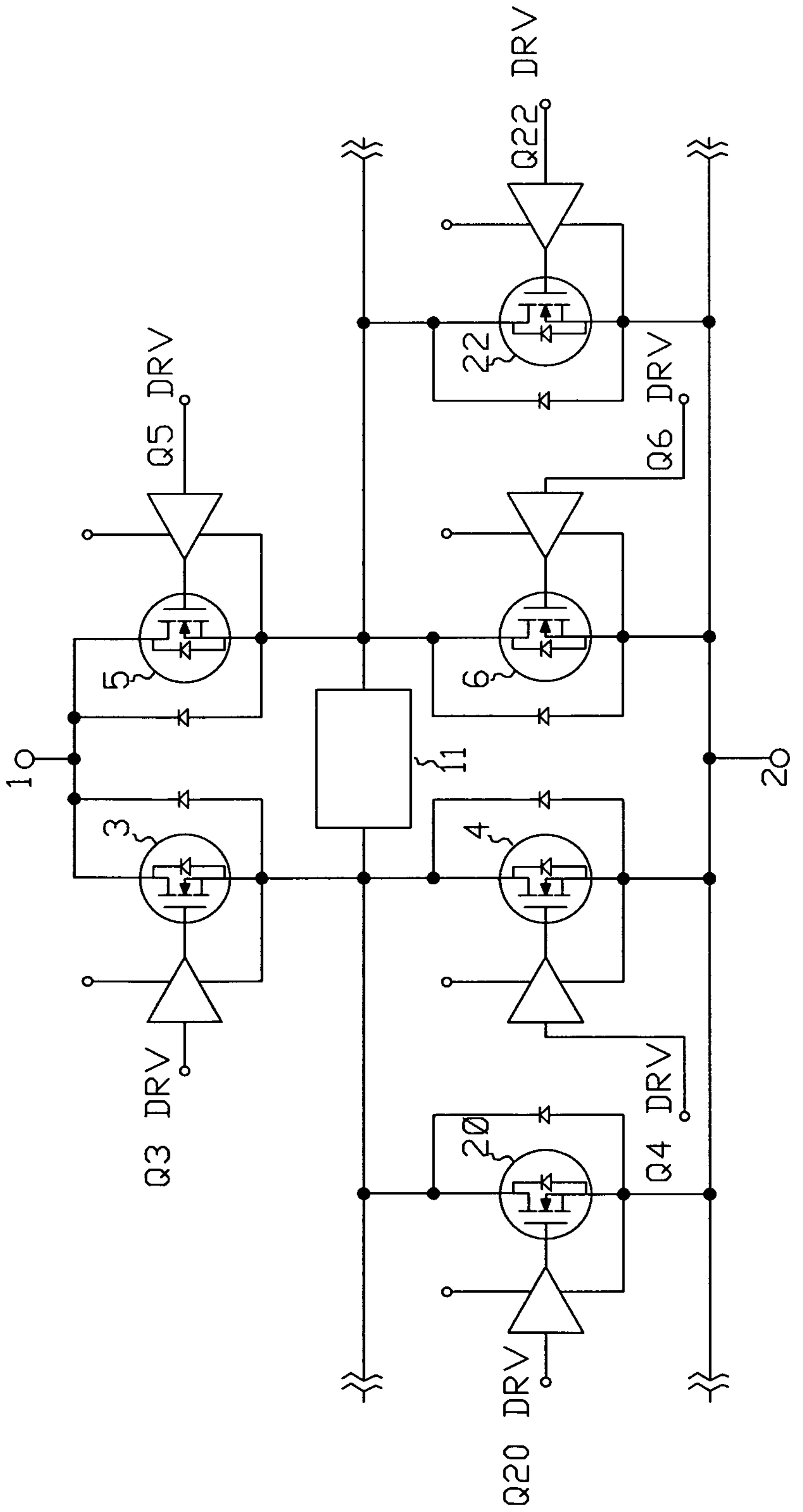
FIG. 11 is a schematic representation of a circuit that contains parallel switching devices in the lower branches of H-bridge.

The current is driven positive for ½ A cycle and then reversed for ½ A cycle by the driver circuit illustrated in FIG. 11. An off state delay of 5% allows for the Mosfets storage and turn off time, i.e., s the period of time it takes to completely turn off the Mosfet. If this time was violated the condition called "shoot through" in which current that otherwise flows through the EMAT coil is diverted through the Mosfets. An example in the case where Mosfet 3 is on and Mosfet 4 turns on before Mosfet 3 has turned off. The result is the excessive current flowing from point 1 to point 2 which can result in a failure of the either one of both of the switching devices. When all of the Mosfets are turned off by the gate drivers, 7, 10, 8 and 9, the output an open circuit. The impedance of the MOSFET H bridge as seen back from the EMAT coil is relatively large at the end of the pulse application and there is minimum current flow in the coil Freewheeling diodes 12, 13, 14 and 15 provide an alternate path for current Mosfets when the current continues to flow from the EMGT which is an inductive load, during turn off of the Mosfets. The Mosfet structure has an "intrinsic diode" which will conduct current when a voltage is applied in the reverse direction across its drain and source (See FIG. 2). If the diodes are not present during the reverse current, the Mosfet can conduct the current for a duration that is greater than the turn-off delay time, which will cause the condition, called "shoot through". As explained paragraph above, this condition can cause a failure of the Mosfets.

An alternative freewheeling Mosfet diode circuit is shown in FIG. 3. This circuit can be used in place of the Mosfet diode circuit shown in FIG. 2. The purpose of this circuit is the same. The diode 14 redirects the current around the Mosfet and diode 16 allows current of appreciable magnitude in the positive direction through the Mosfet. Transient voltages in the negative direction limit the current through the Mosfet to levels well below the critical level that can cause shoot through. Even if the EMAT coil is tuned to the pulse frequency this diode circuit will protect the Mosfets during reverse current flow through the EMAT coil.

Pulsing of the EMAT coil with voltages in excess of 500 volts can cause currents in excess of 100 amperes though the coil. These currents will resonate with tuning capacitance, cable capacitance, coil-to-ground capacitance and capacitance internal to the coil. These resonant or ringing currents are coupled either directly or indirectly to the into the EMAT receiver electronics. Since EMAT receivers are necessarily very sensitive so as to detect the low-level signals typical of EMATs, the ringing transient must decay to minimum value of a few micro volts before accurate measurement of the acoustic response can be obtained.

EMAT systems typically have two modes of operation. The first mode uses two coils of electrically conducting material, one coil to induce and transmit the acoustic wave that travels in a metal component or structure and a second coil that responds to or receives the acoustic waves traveling in the component or structure. The second mode uses only one coil that functions as both transmitter and receiver. Although both modes are affected by this ringing noise, the second mode is normally causes greater ringing at the receiver output. This is attributed to the direct electrical connection of the coil to the receiver electronics input terminals.

The invention includes a switching sequence and driving circuit that can be used to damp the ringing and decrease the decay time of the ringing tone. Damping of the ringing noise should start just before the end of the pulse cycle, e.g., approximately 5% of the on time or last half cycle of the tone burst. Referring to FIG. 2, Mosfet 3 has been in the off state since the beginning of the last half cycle of the tone burst. Mosfet 5 is turned off while Mosfet 4 is kept in the one state. Mosfet 6 is then turned off after the 5% of half cycle delay. This provides a low resistance, parallel or shunt circuit path to the EMAT coil that facilitates rapid damping of the ringing noise. Mosfet 4 and Mosfet 6 are held in the on state until the amplitude of the ringing decays to an acceptable level. If the EMAT coil is also being used as a receiver, all of the Mosfets 3, Mosfet 4, Mosfet 5 and Mosfet 6 are then switched to the off state so that acoustic signals are not damped.

Figure 4:
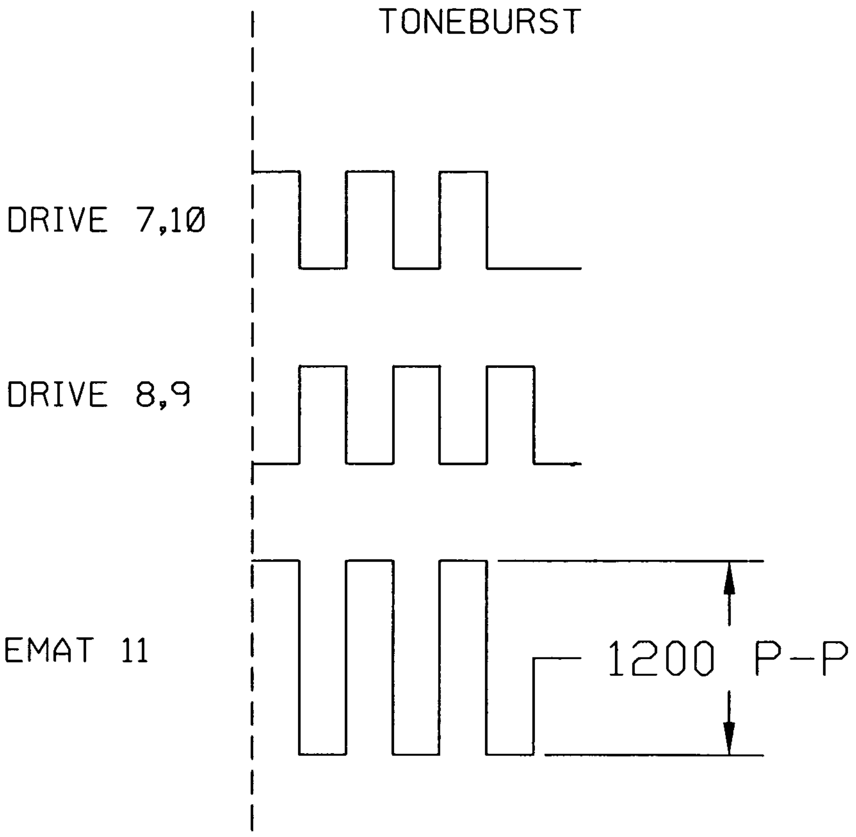
FIG. 4 to FIG. 9 is a drive and output representation of H Bridge for high frequency Tone Burst, Chirp, Code, Modulated, Single Pulse, and Phase Shift Modulation outputs for EMATS

This dynamic damping process can be accelerated by using a plurality of Mosfets connected in parallel to Mosfets 4 and Mosfet 6 as illustrated in FIG. 4. Each of the parallel Mosfets in a group can be controlled by independent drivers so that they can be switched in a sequence that provides optimum damping. All or some of the parallel Mosfet circuits in addition to the diodes can contain circuit elements such as resistors and capacitors connected in series or in parallel with the Mosfets to reduce switching transients and improve ringing decay.

Figure 5:
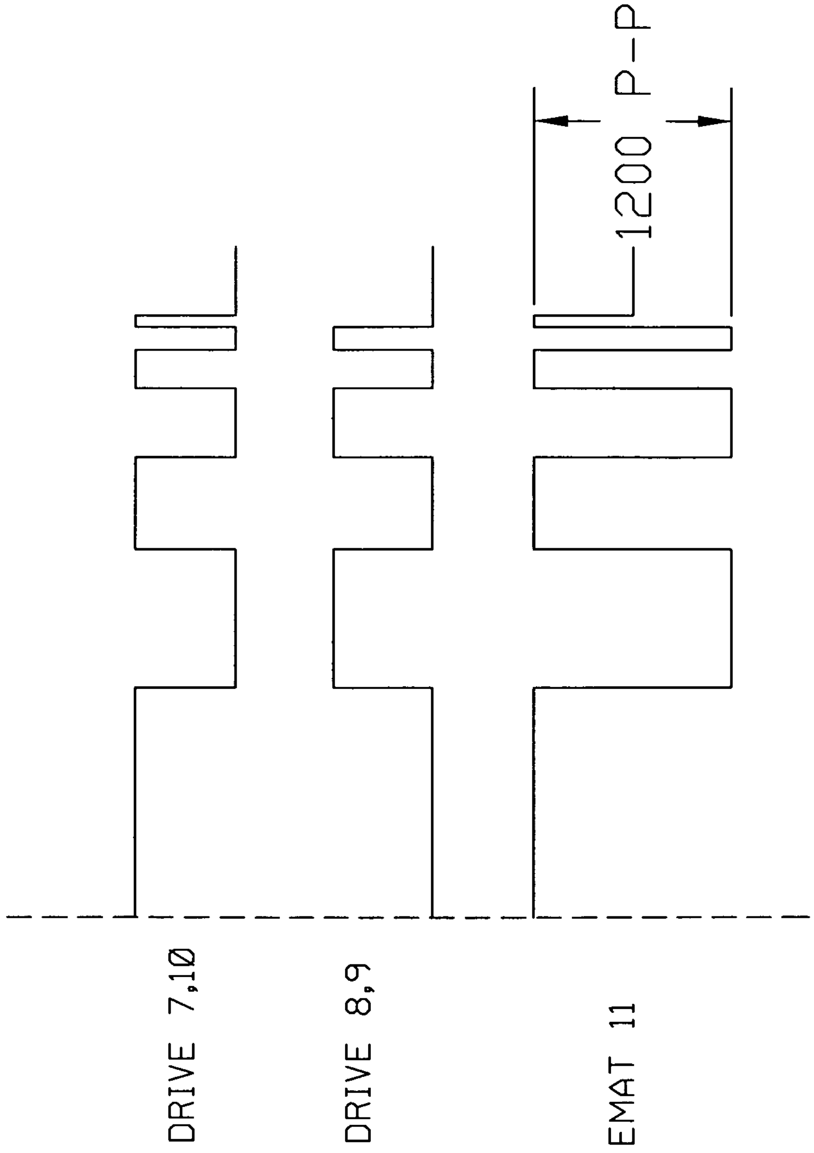
Figure 6:
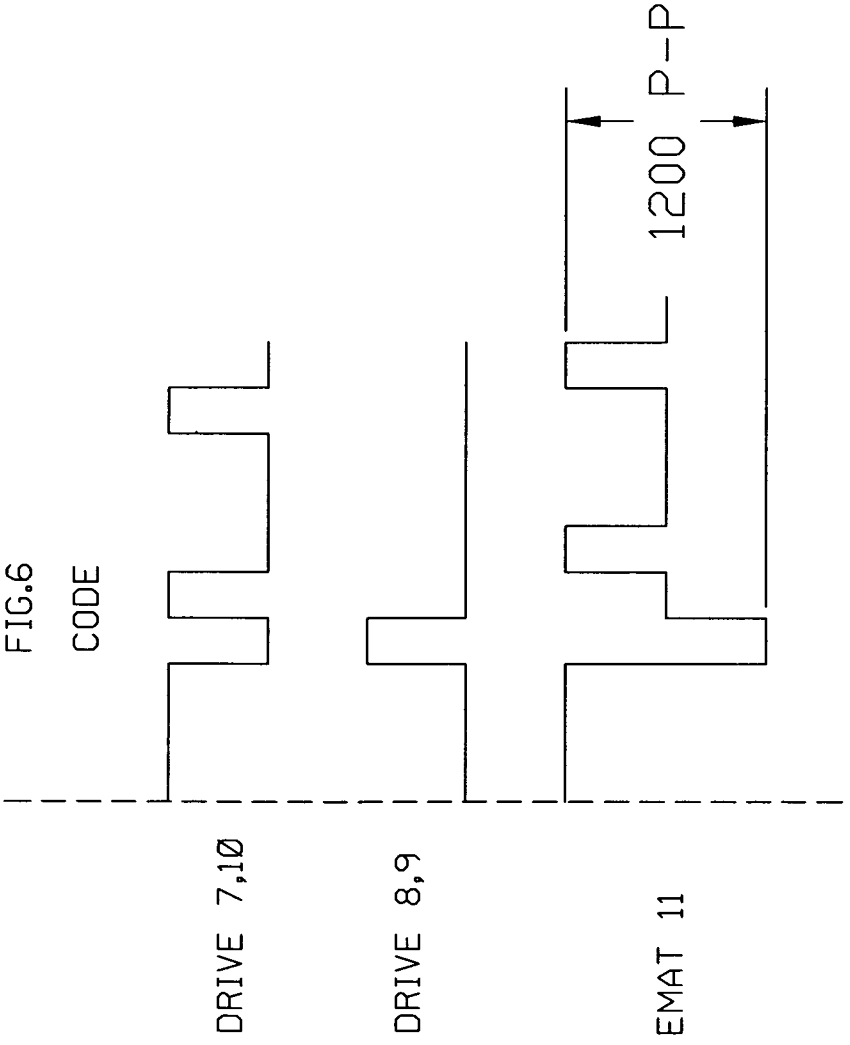
Figure 7:
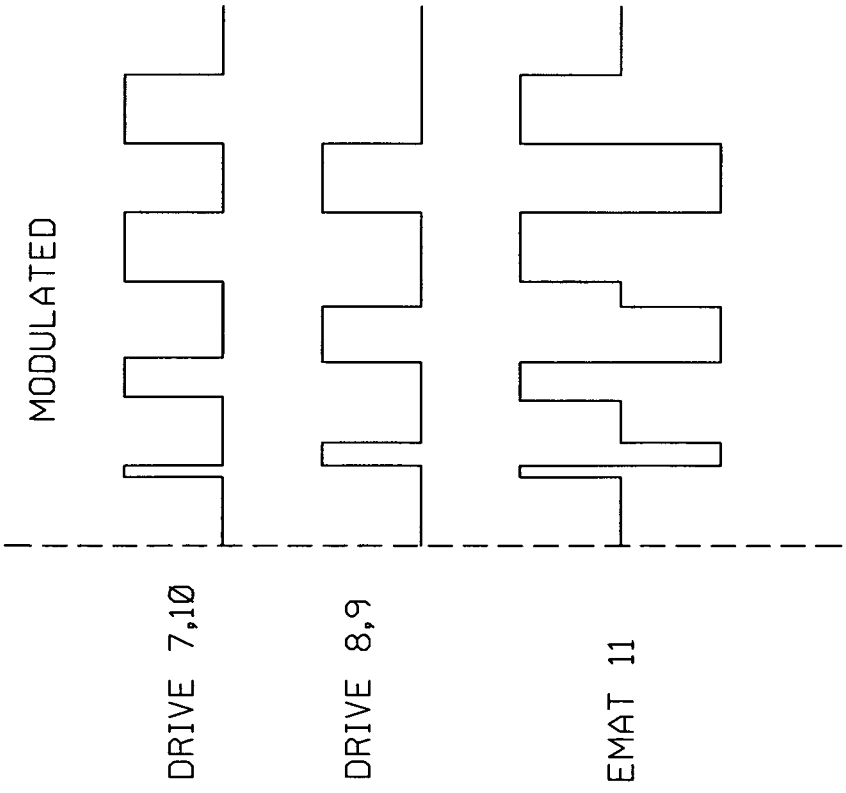
Figure 8:
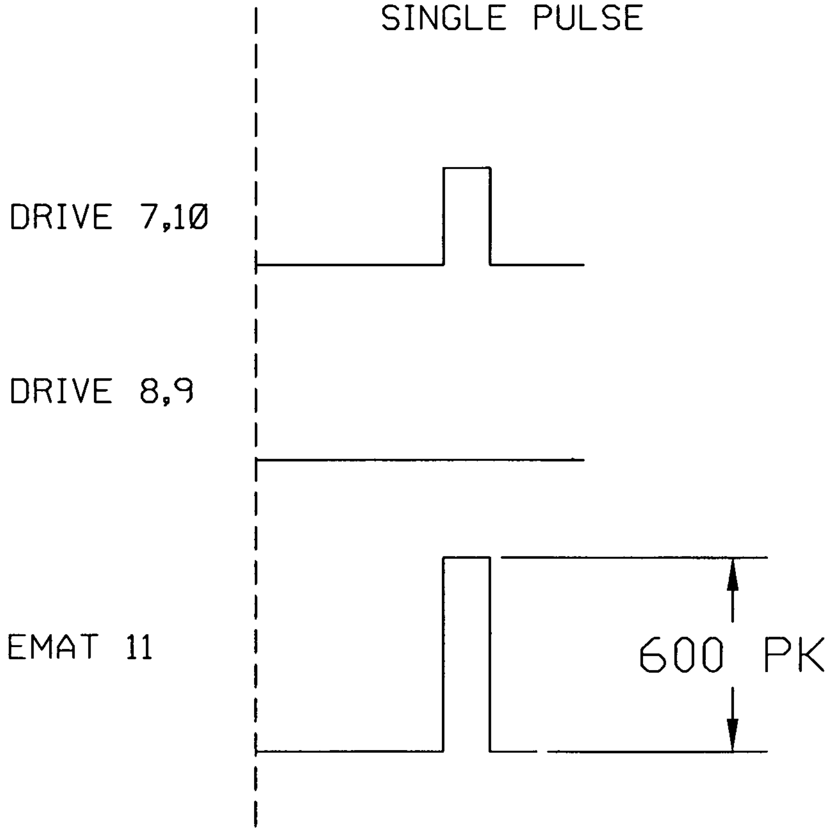
Figure 9:
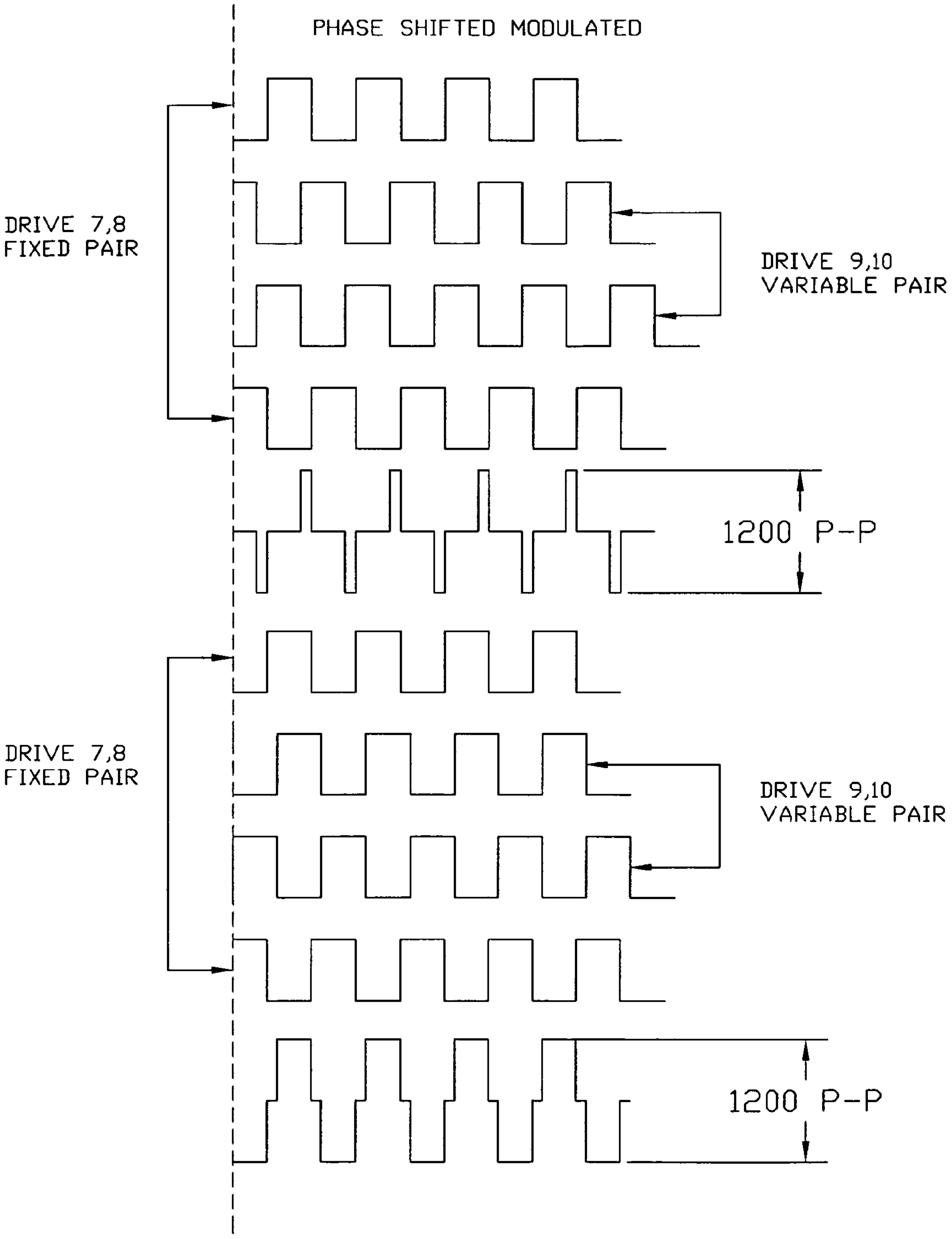
Figure 10:
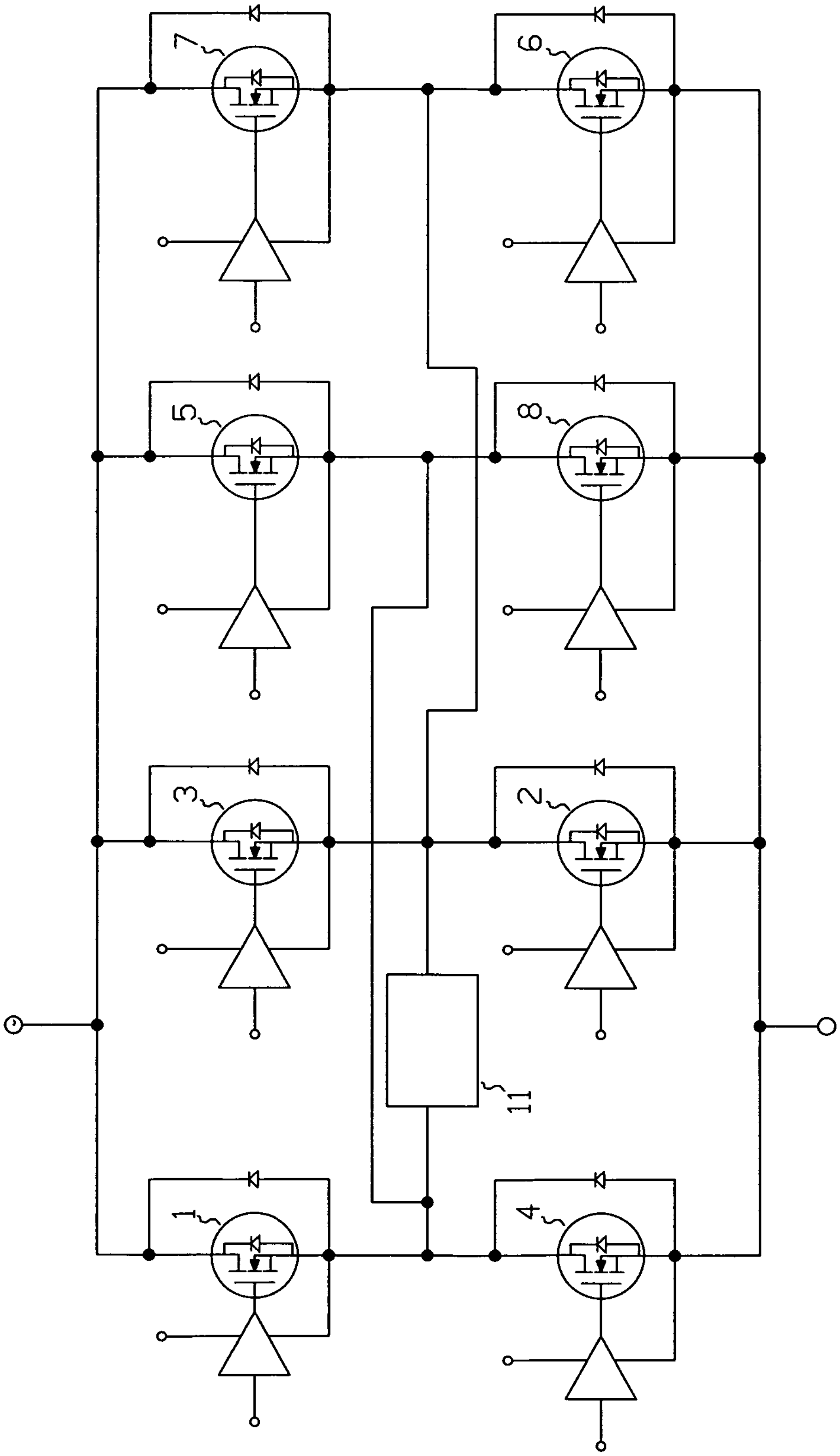
FIG. 10 is a schematic representation of paralleling arrangements of H Bridges.

The electrical power delivered to the EMAT coil can be increased substantially by connecting additional Mosfets in parallel to Mosfets 3, 4, 5 and 6 as illustrated in FIG. 5. Parallel Mosfets of the same type will share the current load, thereby allowing the maximum total current delivered to the EMAT coil to be increased to N times the maximum current allowed for each Mosfet, where N is the number of Mosfets connected in parallel at any branch of the H-bridge. Since the current is distributed equally in each of the Mosfets in each branch of the H-bridge. Since the current is distributed equally in each of the Mosfets in each branch of the H-bridge, the efficiency is increased by a factor of N. Since increased efficiency requires less cooling, a significant reduction in the size of the pulser electronic package can be realized.

Figure 12:
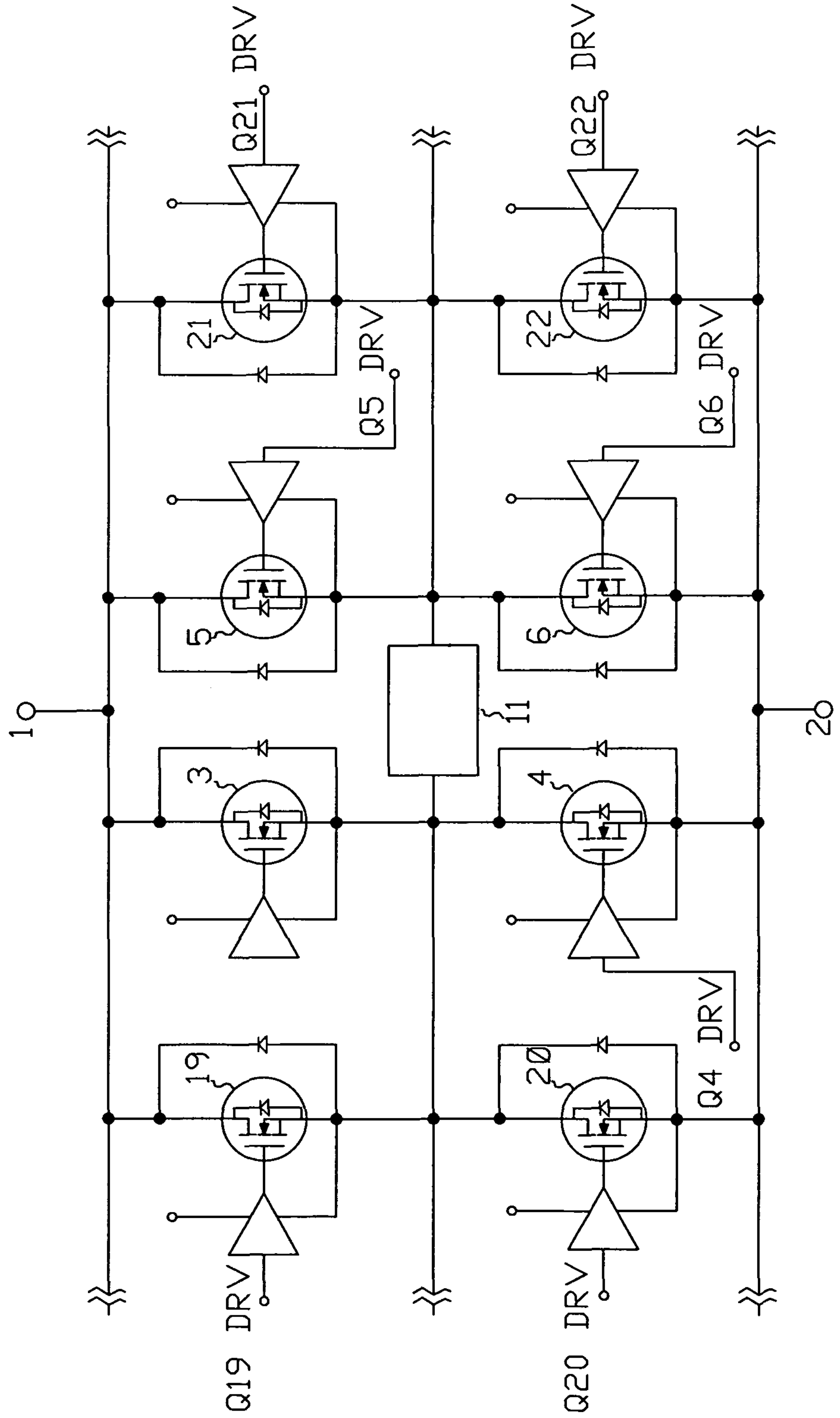
FIG. 12 is a schematic representation of a circuit that contains parallel switching devices in all branches of the H-bridge

Another method of increasing power output and efficiency is to switch the two or more H bridge branches in sequence. Referring to FIG. 12, Mosfet 3 and Mosfet 6 are turned on for a period of time determined by the requirements of the users frequency and pulse period. Mosfet 3 and Mosfet 6 are turned off and Mosfets 4 and 5 are turned on for a time determined by the requirements of the users frequency and pulse period. Mosfet 4 and 5 are turned off and Mosfets 19 and 22 are turned on for a time determined by the requirements of the users frequency and pulse period. Mosfets 20 and 21 are then switched off. This completes two cycles of the of the tone burst through the EMAT coil additional cycles can be added by repeating the sequence beginning with turning on Mosfets 3 and 6.

The advantage of sequential switching of parallel Mosfets in this manner is that the currents through each Mosfet are the same but the time that any Mosfet is on is one half of the time for that of the basic H-bridge of FIG. 2 that has single Mosfets in each branch. As a result, the power delivered to EMAT could can be doubled and the current can be increased by the square root of 2 without damage to the Mosfets. This configuration can be expanded to N Mosfets in each branch which allows a Mosfet to be on for a duration that is 1/Nth of the time of an H bridge that has a single element in each branch.

Figure 13:
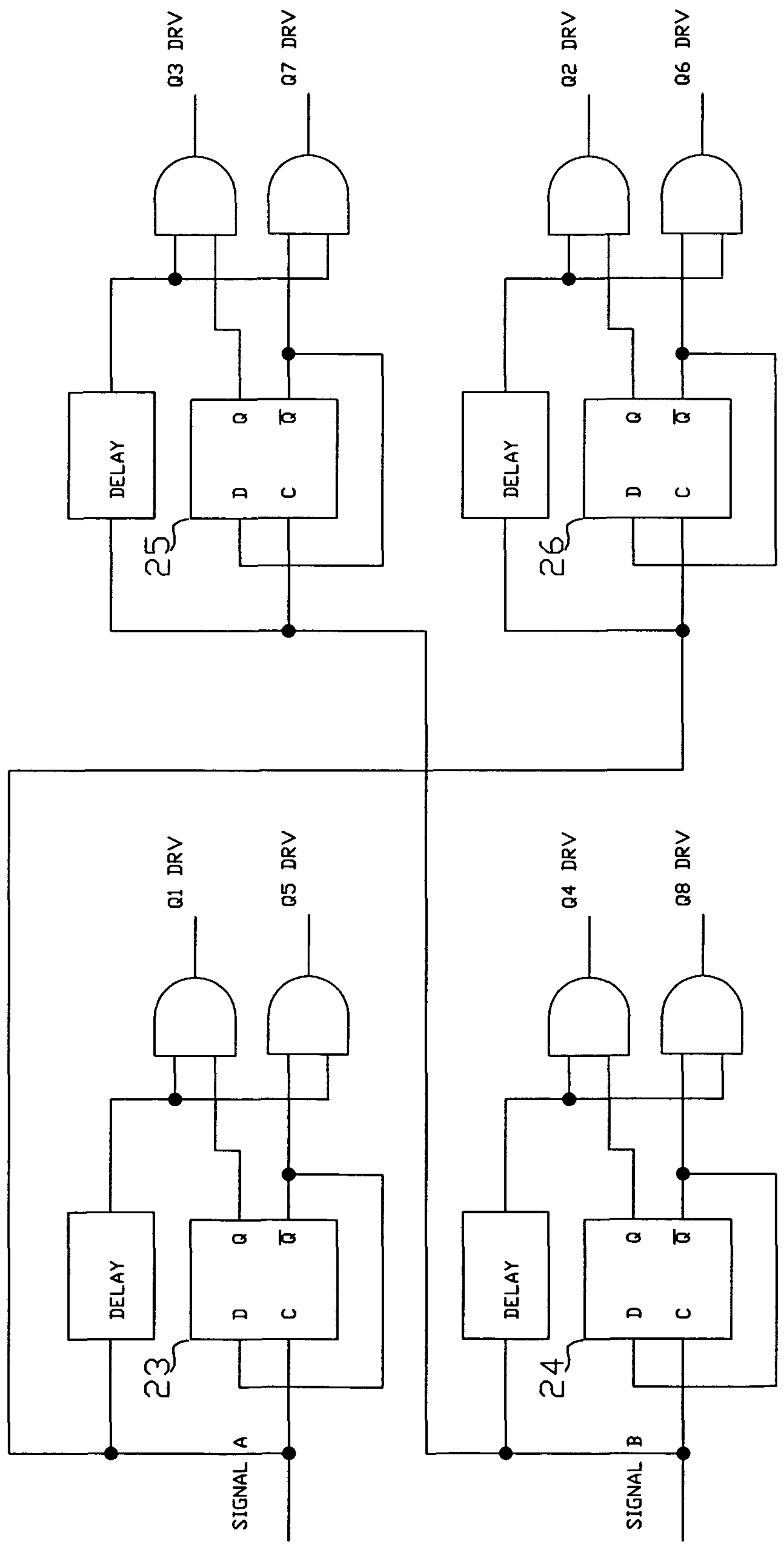
FIG. 13 is a schematic representation of a logic circuit that provides the drive inputs to each of the Mosfets in proper sequence.

FIG. 13 is a schematic of a logic circuit that provides the drive inputs to each of the Mosfets in proper sequence for the generation of current outputs. The circuit is comprised of four units, each containing a RS Flip-Flop, a delay and 2 AND gates. The tone burst drive signal is applied to inputs C, of all four Flip-Flops, 23, 24, 25 and 26. The combination of the Flip-Flop outputs and the delay output are applied to the AND gates to determine when each Mosfet drives are positive. A Mosfet is turned on within few nanoseconds after its drive goes positive. Similar but expanded logic circuit can be used to generate the Switching sequence for an H-Bridge pulser that has N parallel Mosfets in each branch.

Figure 14:
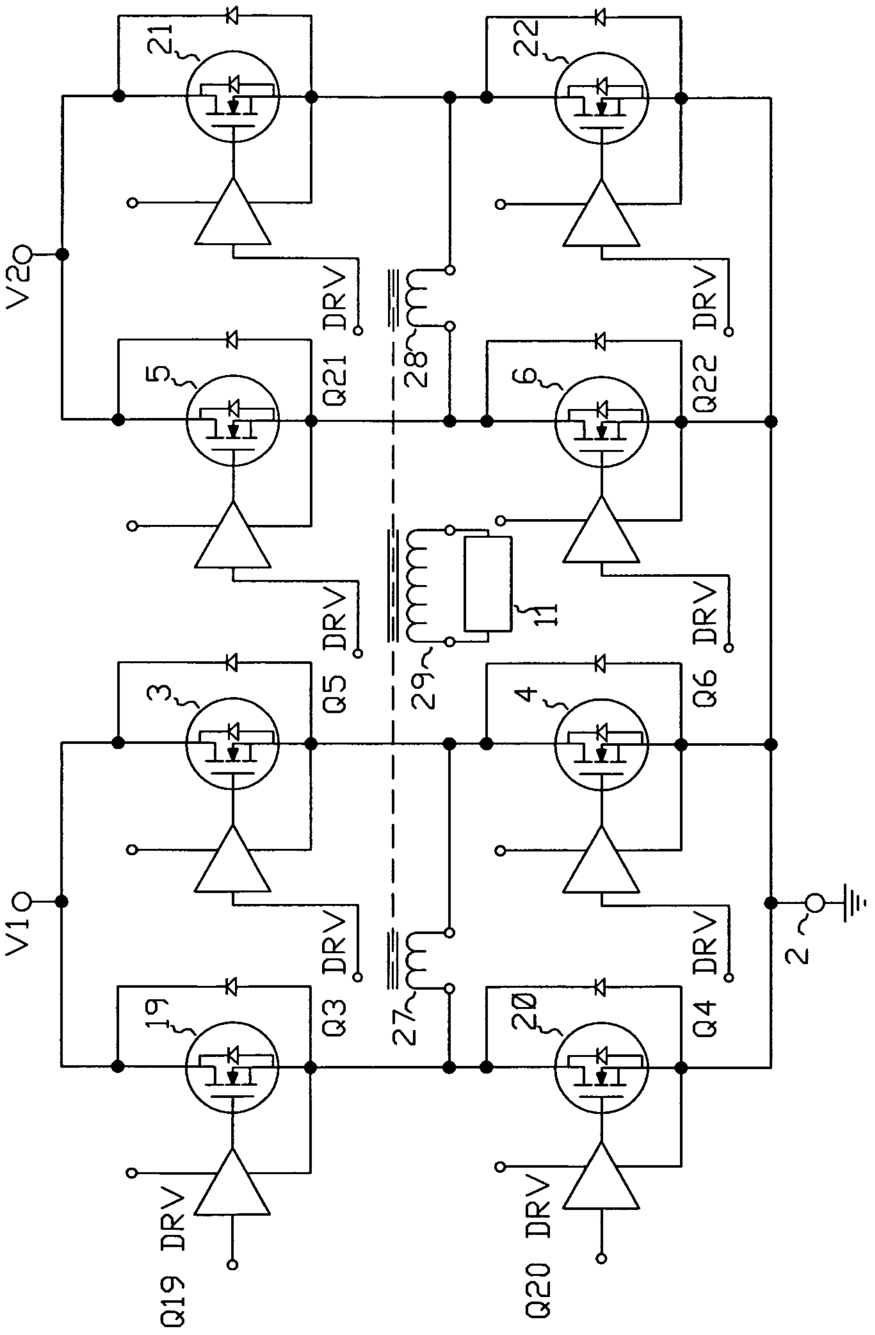
FIG. 14. is a schematic representation of a H-bridges connected in parallel containing switching devices with outputs coupled in parallel through transformer windings in all branches of the H-bridge.
Figure 15:
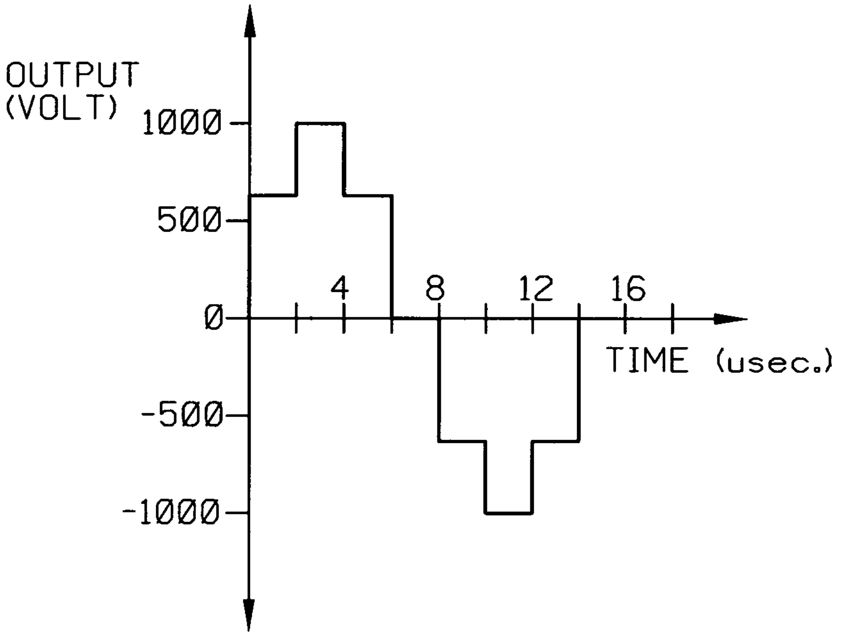
FIG. 15 is an approximate sinusoidal waveform composed of 6 discrete steps by the parallel H-bridge.

The pulse sequencing provided by the circuits that are similar to circuit of FIG. 13 can be applied to a transducer coupled H-bridge composed of paralleled switching devices to generate amplitude, modulated tone bursts for EMAT coils. FIG. 14 is a schematic of an H-bridge that contains 2 parallel Mosfets in each branch. Described is the example where a stepped waveform is generated as illustrated in FIG. 15. The sequence starts by turning on Mosfets 19 and 4 to apply a voltage pulse to transformer winding 27. The turns ration between the input winding 27, and the output winding 29, is 1:1 and the voltage applied to the input winding 27, is positive V volts. This results in an output voltage at the terminals of transformer winding 29, of V volts.

After a time delay equal to approximately $\frac{1}{6}^{th}$ of a tone burst cycle, Mosfets 19 and 4 are turned off and after an additional, small delay required for Mosfets 19 and 4 to turn off, Mosfets 5 and 22 are turned on for another $\frac{1}{6}^{th}$ tone burst cycle. This applies a voltage pulse twice the value (2V) to transformer winding 28 which results in a potential of 2V at the output terminals of the winding 29. Toward the end of the second ⅙ cycle, Mosfets 5 and 22 are turned off and Mosfets 19 and 4 are turned on again after a small delay required for Mosfets 5 and 22 to turn completely off. This generates the positive half of the first cycle in the tone burst. An identical switching sequence of drive voltages is the applied to the gates of Mosfets 3 and 20 and then the gates of Mosfetsl 21 and 6 to generate the negative half of the first cycle in the tone burst.

Figure 16:
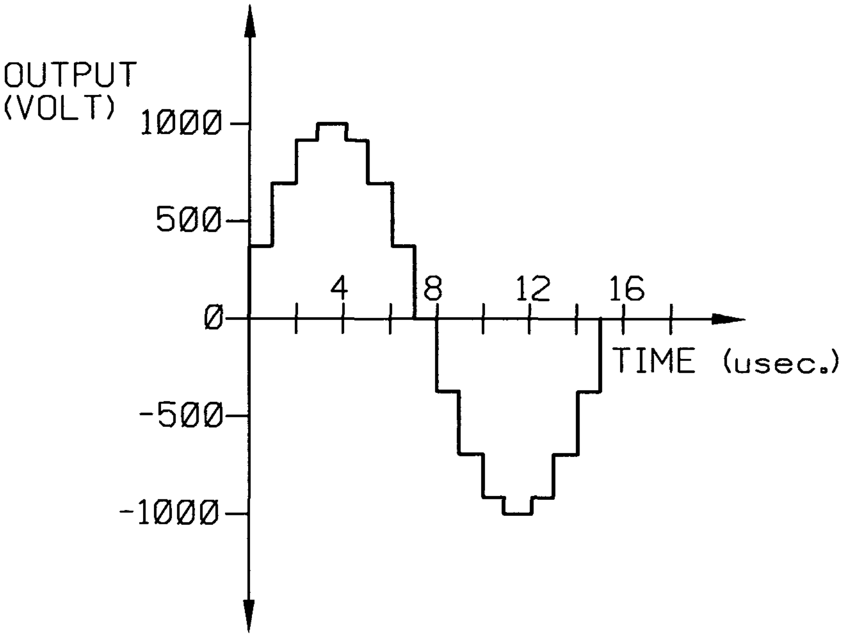
FIG. 16 is an approximate sinusoidal waveform composed of 12 discrete steps by an Expanded, paralleled H-bridge.
Figure 17:
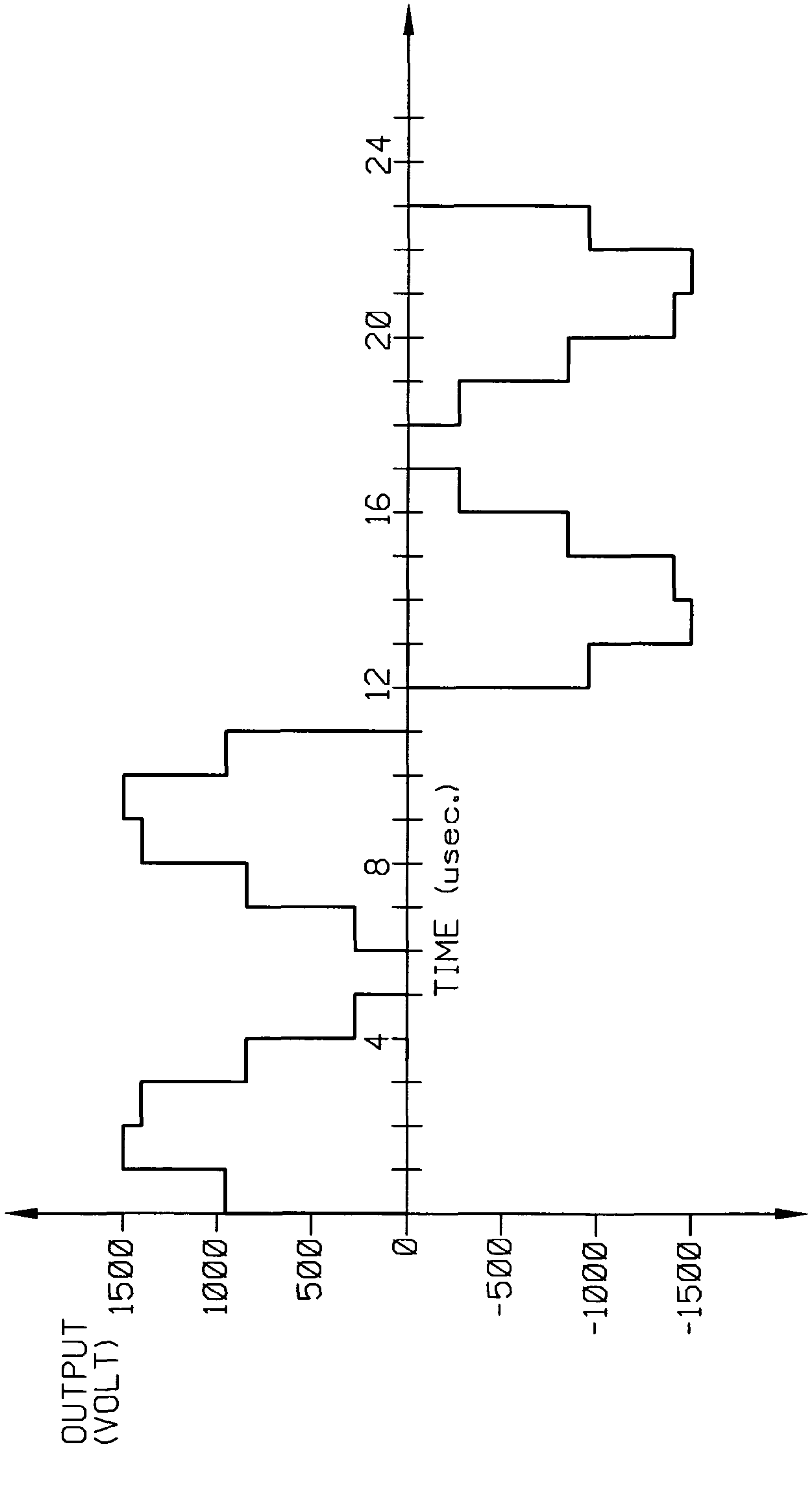
FIG. 17 are two approximate sinusoidal waveforms of two frequencies, 500 KHz and 1000 KHz, composed of 12 discrete steps by an expanded, paralleled H-bridge.

The circuit illustrated in FIG. 14 can be expanded by the connection of additional parallel Mosfets to generate output wave forms that have refined definitions and specific frequency content. FIG. 16 illustrates an output that approximates a sinusoidal wave form with greater precision than the waveform illustrated in FIG. 15. This provides the benefit of reducing the harmonic content, in particular the second and third harmonics, to produce a substantial improvement in the quality of nonlinear ultrasonic tests. A second benefit is the generation of an output wave from that contains two or more frequencies of sufficient amplitude to perform simultaneous, multi-frequency ultrasonic inspections. FIG. 17 illustrates a waveform that is the composite of two dominant frequencies, a fundamental at 500 KHz and the second harmonic at 1000 KHz.

This waveform can be produced by a combination of 16 Mosfets where there are 4 in parallel in each branch of the expanded H-bridge. Since the output waveform is composed of 8 discreet voltage levels, more than 90 percent of the energy that is transmitted to the EMAT coil is divided between the fundamental and second harmonic. It is important to note that the frequency composition is not necessarily a combination of a fundamental and its harmonics. For example, a careful selection of switching intervals and sequences can provide optimum simultaneous inspection with several frequencies and a number of corresponding ultrasonic modes.

The invention claimed is:

1. A method of increasing power output for an electromagnetic acoustic transducer (EMAT) comprising providing parallel outputs for said EMAT using an H-bridge pulse generator and including providing a signal drive sequence to produce a phase shift modulated output for said EMAT which, during reasonance at load, produces a lossless Hemming pattern.

2. A transmitting switching circuit for electromagnetic acoustic transducers (EMATS) with a coil without a transformer, said circuit comprising driving means for driving the EMAT without a transformer, first and second means for, respectively, selectively redirecting current to the EMAT coil and selectively starting and ending current flow, said second means being operatively connected to said first means and wherein said circuit can produce a low frequency tone increasing to a frequency tone (CHIRP).

3. A switching circuit as in claim 2 wherein said circuit can produce a short group of various positives and negative cycles at a given frequency, then stop for a period of time and then repeat.

4. A transmitting switching circuit for electromagnetic acoustic transducers (EMATS) with a coil without a transformer, said circuit comprising driving means for driving the EMAT without a transformer first and second means for, respectively, selectively redirecting current to the EMAT coil and selectively starting and ending current flow, said second means being operatively connected to said means wherein said circuit can produce a rectangular window tone burst which is achieved by turning on and off four switches which are optical drivers and wherein there are twice the number of switches in a parallel circuit.

5. An improved electronic pulser circuit based on H-bridge topology for driving inductive coils such as the transmitter coil of an electromagnetic acoustic transducer (EMAT) so as to provide extended performance in terms of increased power output, stability, reduced noise and generation of complex output wave forms, said circuit including a diode inserted in series with the switching device which comprises a transmitting switching circuit for an electromagnet acoustic transducer (EMAT) comprising means for driving the EMAT without a transformer at the desired high frequencies a first means for selectively redirecting the electrical current, connected to the EMAT coil, a second means for selectively starting current flow and ending current flow, connected by the first means, to prevent the flow of current in a direction that is in opposite polarity to the source voltage.

6. A plurality of switching devices as in claim 5 including but not limited to power Mosfets connected in parallel in the lower branches of the H-bridge configuration whereby said switching devices are turned on and off in timed sequences that cause quenching of the transient electrical current flowing through a coil such as an EMAT coil.

7. A plurality of switching devices as in claim 5 including but not limited to power Mosfets connected in parallel in all branches of the H-bridge configuration whereby said switching devices are turned on and off in timed sequences that result in increased efficiency and greater electrical power delivered to a coil such as a EMAT coil.

8. A plurality of switching devices as in claim 5 including but not limited to power Mosfets connected in parallel in all branches of the H-bridge configuration whereby said switching devices are turned on and off in timed sequences that allow the other said switching devices in the same branch to be turned off when any one of the said switching devices in that branch is turned on thereby increasing the efficiency of the pulser in delivering increased electrical power to a coil such as an EMAT coil.

9. A logic circuit as in claim 8 comprised of four units, each containing an RS Flip-Flop, a delay and 2 AND gates that provides the drive inputs to each of the Mosfets in proper sequence for the generation of current outputs from each of the switching devices in a branch of the H-bridge and delivers current to the EMAT coil while the other switching devices in a branch are turned off.

10. A plurality of H-bridge circuits each containing switching devices as in claim 5 including but not limited to power Mosfets with outputs coupled in parallel through transformer windings in all branches of the H-bridge configuration whereby said switching devices are turned on and off in timed sequences that result in an amplitude modulated output voltage and current that is concentrated in select narrow power spectrums.

* * * * *